United States Patent
Lawal et al.

(10) Patent No.: US 11,666,862 B2
(45) Date of Patent: Jun. 6, 2023

(54) AIR GAP MEMBRANE DISTILLATION

(71) Applicants: Saudi Arabian Oil Company, Dhahran (SA); King Fahd University of Petroleum & Minerals, Dhahran (SA)

(72) Inventors: Dahiru Umar Lawal, Dhahran (SA); Mohammed Abdul Azeem, Dhahran (SA); Turki Nabieh Baroud, Dhahran (SA); Atia Khalifa, Dhahran (SA); Hasan Al Abdulgader, Dammam (SA)

(73) Assignee: King Fahd University of Petroleum & Minerals, Saudi Arabian Oil Company, Dhahran (SA)

( * ) Notice: Subject to any disclaimer, the term of this patent is extended or adjusted under 35 U.S.C. 154(b) by 249 days.

(21) Appl. No.: 17/094,468

(22) Filed: Nov. 10, 2020

(65) Prior Publication Data
US 2022/0143553 A1     May 12, 2022

(51) Int. Cl.
*B01D 61/36*       (2006.01)
*B01D 69/06*       (2006.01)
(Continued)

(52) U.S. Cl.
CPC ......... *B01D 61/364* (2013.01); *B01D 61/366* (2013.01); *B01D 61/368* (2013.01);
(Continued)

(58) Field of Classification Search
CPC .. B01D 61/364; B01D 61/366; B01D 61/368; B01D 69/06; B01D 71/36; B01D 2313/38; B01D 2317/02; C02F 1/447
See application file for complete search history.

(56) References Cited

U.S. PATENT DOCUMENTS 3,878,054 A  *  4/1975  Rodgers .................... C02F 1/14
                                                203/11
10,392,270 B2    8/2019  Swaminathan et al.
(Continued)

FOREIGN PATENT DOCUMENTS

JP      H09108547       4/1997
WO      WO 2013151498   10/2013
WO      WO 2015162314   10/2015

OTHER PUBLICATIONS

Mahmoudi et al., "A unique permeate gap membrane distillation system for combined fresh water and power production," Energy Procedia, 2019, 160:170-177.
(Continued)

*Primary Examiner* — Krishnan S Menon
(74) *Attorney, Agent, or Firm* — Fish & Richardson P.C.

(57) ABSTRACT

A membrane distillation apparatus includes a housing and an impeller. The housing includes a hot medium compartment, a cold medium compartment, an air gap compartment, a membrane, and a thermally conductive plate. The hot medium compartment includes a hot medium inlet configured to receive a hot medium stream including water. The cold medium compartment includes a cold medium inlet configured to receive a cold medium stream. The membrane defines pores that are sized to allow water vapor originating from the hot medium stream to pass from the hot medium compartment through the membrane to the air gap compartment. The thermally conductive plate and the cold medium stream are cooperatively configured to condense the water vapor from the hot medium stream. The air gap compartment is substantially filled with air and includes a permeate outlet configured to discharge the condensed water vapor. The impeller is disposed within the air gap compartment.

19 Claims, 5 Drawing Sheets

(51) Int. Cl.
*B01D 71/36* (2006.01)
*C02F 1/44* (2023.01)

(52) U.S. Cl.
CPC ............. *B01D 69/06* (2013.01); *B01D 71/36* (2013.01); *C02F 1/447* (2013.01); *B01D 2313/221* (2022.08); *B01D 2317/02* (2013.01)

(56) References Cited

U.S. PATENT DOCUMENTS

| | | | |
|---|---|---|---|
| 2004/0060808 A1* | 4/2004 | LaViolette | B01D 3/346 202/234 |
| 2014/0305789 A1 | 10/2014 | Lowenstein | |
| 2016/0074812 A1 | 3/2016 | Lienhard et al. | |
| 2016/0107121 A1 | 4/2016 | Lienhard et al. | |
| 2017/0361277 A1 | 12/2017 | Ghaffour et al. | |
| 2019/0299164 A1 | 10/2019 | Khalifa | |
| 2020/0109070 A1 | 4/2020 | Hashimoto et al. | |
| 2021/0060492 A1 | 3/2021 | Klaehn et al. | |
| 2021/0260531 A1 | 8/2021 | Falath et al. | |
| 2022/0144671 A1 | 5/2022 | Lawal et al. | |

OTHER PUBLICATIONS

Riera, "Integrated solution for DWTP reverse osmosis brine management: CO2 stripping followed by membrane distillation," Aalto University School of Chemical Technology, Master's Thesis for the degree of Master of Science in Technology, Dec. 2015, 92 pages.
Alkhudhiri et al., "Air gap membrane distillation: a detailed study of high saline solution," Desalination, 2017, 403:179-186.
Alklaibi et al., "Transport analysis of air-gap membrane distillation. Journal of membrane science," Journal of Membrane Science, 2005, 255(1):239-253.
Essalhi et al., "Application of a porous composite hydrophobic/hydrophilic membrane in desalination by air gap and liquid gap membrane distillation: a comparative study," Separation Purification Technology, 2014, 133:176-186.
Francis et al., "Material gap membrane distillation: A new design for water vapor flux enhancement," Journal of Membrane Science, 2013, 448:240-247.
Janajreh et al., "Numerical investigation of air gap membrane distillation (AGMD): Seeking optimal performance," Desalination, 2017, 424:122-130.
Jiang, "Separation of water out of highly concentrated electrolyte solutions using multistage vacuum membrane distillation," KTH School of Industrial Engineering and Management, Master's of Science Thesis, Sep. 2013, 82 pages.
Khalifa et al., "Application of Response Surface and Taguchi Optimization Techniques to Air Gap Membrane Distillation for Water Desalination—A Comparative Study," Desalination and water treatment, 2016, 57(59):28513-28530.
Khalifa et al., "Experimental and theoretical investigation on water desalination using air gap membrane distillation," Desalination, 2015, 376:94-108.
Khalifa et al., "Flux enhanced water gap membrane distillation process-circulation of gap water," Separation and Purification Technology, 2020, 231:1-9.
Khalifa et al., "Performance and Optimization of Air Gap Membrane Distillation System for Water Desalination," Arabian Journal for Science and Engineering, 2015, 13 pages.
Khalifa et al., "Water and air gap membrane distillation for water desalination—An experimental comparative study," Separation and Purification Technology, 2015, 141:276-284.
Khalifa, "Performances of air gap and water gap MD desalination modules," Water Practice and Technology, 2018, 13 (1):200-209.
Lawal et al., "Experimental investigation of an air gap membrane distillation unit with double-sided cooling channel," Desalination and Water Treatment, 2015, 57(24), 16 pages.
Li et al., "Microporous polypropylene and polyethylene hollow fiber membranes. Part 3. Experimental studies on membrane distillation for desalination," Desalination, 2003, 155(2):153-156.
Liu et al., "Experimental study of the optimal vacuum pressure in vacuum assisted air gap membrane distillation process," Desalination, 2017, 414:63-72.
Naidu et al., "Hybrid membrane distillation: Resource, nutrient and energy recovery," Journal of Membrane Science, 2020, 599:1-21.
Swaminathan et al., "Energy efficiency of permeate gap and novel conductive gap membrane distillation," Journal of Membrane Science, Sep. 2016, 502, 20 pages.
PCT International Search Report and Written Opinion in International Appln. No. PCT/US2021/058525, dated Jan. 27, 2022, 12 pages.
PCT International Search Report and Written Opinion in International Appln. No. PCT/US2021/058531, dated Jan. 27, 2022, 12 pages.
U.S. Appl. No. 17/892,269, filed Aug. 22, 2022, Lawal et al.
U.S. Appl. No. 17/892,284, filed Aug. 22, 2022, Lawal et al.
U.S. Appl. No. 17/892,306, filed Aug. 22, 2022, Lawal et al.
U.S. Appl. No. 17/892,347, filed Aug. 22, 2022, Lawal et al.
U.S. Appl. No. 17/892,380, filed Aug. 22, 2022, Lawal et al.
Cao et al., "Seawater desalination based on a bubbling and vacuum-enhanced direct contact membrane distillation," International Journal of Chemical Engineering, Oct. 2021, 2021:3587057, 15 pages.
Chen et al., "Performance enhancement and scaling control with gas bubbling in direct membrane distillation," Desalination, Jan. 2013, 308:47-55, 9 pages.
Cui et al., "The use of gas bubbling to enhance membrane processes," Journal of Membrane Science, Aug. 2003, 221(1-2):1-35, 35 pages.
Gao et al., "Experimental study of hollow fiber permeate gap membrane distillation and its performance comparison with DCMD and SGMD," Separation and Purification Technology, Nov. 2017, 188:11-23, 13 pages.
Pan et al., "Experimental and Numerical Investigations on Gas Injection-Enhanced Air Gap Membrane Distillation for Water Desalination," Ind. Eng. Chem. Res. 2022, 61:1850-1862, American Chemical Society, 2022, 13 pages.

* cited by examiner

AIR GAP MEMBRANE DISTILLATION

TECHNICAL FIELD

This disclosure relates to membrane distillation, and in particular, air gap membrane distillation.

BACKGROUND

Membrane distillation is a separation process that is driven by phase change. A membrane provides a barrier for a liquid phase while allowing a vapor phase to pass through the membrane. Membrane distillation can be used, for example, in water treatment. Several membrane distillation methods exist. Some examples include direct contact membrane distillation, air gap membrane distillation, vacuum membrane distillation, sweeping gas membrane distillation, vacuum multi-effect membrane distillation, and air gap membrane distillation.

SUMMARY

This disclosure describes technologies relating to membrane distillation, and in particular, air gap membrane distillation.

Certain aspects of the subject matter described can be implemented as a membrane distillation apparatus. The apparatus includes a housing and an impeller. The housing includes a hot medium compartment, a cold medium compartment, an air gap compartment, a membrane, and a thermally conductive plate. The hot medium compartment includes a hot medium inlet and a hot medium outlet. The hot medium inlet is configured to receive a hot medium stream including water. The cold medium compartment includes a cold medium inlet and a cold medium outlet. The cold medium inlet is configured to receive a cold medium stream. The air gap compartment includes a permeate outlet. The air gap compartment is intermediate of the hot medium compartment and the cold medium compartment. The air gap compartment is substantially filled with air. The membrane is disposed between the hot medium compartment and the air gap compartment. The membrane defines pores that are sized to allow water vapor originating from the hot medium stream to pass from the hot medium compartment through the membrane to the air gap compartment. The thermally conductive plate is disposed between the air gap compartment and the cold medium compartment. The thermally conductive plate and the cold medium stream within the cold medium compartment are cooperatively configured to condense the water vapor from the hot medium compartment that passed through the membrane. The permeate outlet is configured to discharge the condensed water vapor from the air gap compartment. The impeller is disposed within the air gap compartment. The impeller is connected to a rotatable shaft that is configured to couple to and be rotated by a motor. The impeller is configured to mix fluid within the air gap compartment in response to the rotatable shaft being rotated by the motor.

This, and other aspects, can include one or more of the following features.

In some implementations, the housing includes a first end and a second end opposite the first end. In some implementations, each of the hot medium compartment, the air gap compartment, the cold medium compartment, the membrane, and the thermally conductive plate span from the first end to the first end. In some implementations, the hot medium inlet and the cold medium outlet are disposed at the first end of the housing. In some implementations, the hot medium outlet and the cold medium inlet are disposed at the second end of the housing.

In some implementations, the membrane is configured to prevent liquid from passing through the membrane. In some implementations, the membrane includes a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane.

In some implementations, a contact angle of a droplet of the hot medium stream on the membrane is greater than 90 degrees)(°.

In some implementations, the impeller has a blade angle in a range of from 1° to 55°.

In some implementations, the thermally conductive plate includes metal, composite material, carbon fibers, carbon nanotubes, or sapphire.

In some implementations, the hot medium stream includes seawater, industrial wastewater, brackish water, produced water, fruit juice, blood, milk, dye, non-condensable gas, non-potable water, or a combination of these.

In some implementations, the cold medium stream includes the hot medium stream after the hot medium stream has been cooled, water, air, oil, or a combination of these.

In some implementations, the apparatus includes a first heat exchanger in fluid communication with the hot medium compartment and the membrane. In some implementations, the first heat exchanger is configured to heat the hot medium stream before the hot medium stream is received by the hot medium inlet.

In some implementations, the apparatus includes a second heat exchanger in fluid communication with the cold medium compartment and the thermally conductive plate. In some implementations, the second heat exchanger is configured to cool the cold medium stream before the cold medium stream is received by the cold medium inlet.

Certain aspects of the subject matter described can be implemented as a method. A feed stream including water is received in a hot medium compartment of a membrane distillation apparatus. A cold medium stream is received in a cold medium compartment of the membrane distillation apparatus. The membrane distillation apparatus includes an air gap compartment that is intermediate of the hot medium compartment and the cold medium compartment. Water vapor originating from the feed stream is allowed by a membrane to pass from the hot medium compartment through the membrane to the air gap compartment while preventing liquid from passing through the membrane. The membrane is disposed within the membrane distillation apparatus between the hot medium compartment and the air gap compartment. An impeller disposed within the air gap compartment is rotated, thereby resulting in mixing fluid within the air gap compartment, decreasing pressure on a side of the membrane facing the air gap compartment, and promoting heat and mass transfer within the air gap compartment. The water vapor from the hot medium compartment that passed through the membrane is condensed by a thermally conductive plate to form a permeate stream having a water purity level that is greater than that of the feed stream. The thermally conductive plate is disposed within the membrane distillation apparatus between the cold medium compartment and the air gap compartment. The permeate stream is discharged from the membrane distillation apparatus by a permeate outlet of the air gap compartment.

This, and other aspects, can include one or more of the following features.

In some implementations, condensing the water vapor from the hot medium compartment that passed through the membrane includes contacting the water vapor on a first side of the thermally conductive plate facing the air gap compartment and contacting the cold medium stream on a second side of the thermally conductive plate facing the cold medium compartment.

In some implementations, the method includes heating the feed stream by a first heat exchanger before the feed stream is received in the hot medium compartment.

In some implementations, the method includes heating the membrane by the first heat exchanger.

In some implementations, the method includes cooling the cold medium stream by a second heat exchanger before the cold medium stream is received in the cold medium compartment.

In some implementations, the method includes cooling the thermally conductive plate by the second heat exchanger.

Certain aspects of the subject matter described can be implemented as a membrane distillation system. The system includes an apparatus and a motor. The apparatus includes a housing and an impeller. The housing includes a first end and a second end opposite the first end. The housing includes a hot medium compartment, a cold medium compartment, an air gap compartment, a membrane, and a thermally conductive plate. The hot medium compartment spans from the first end to the second end. The hot medium compartment includes a hot medium inlet and a hot medium outlet. The hot medium inlet is disposed at the first end. The hot medium inlet is configured to receive a hot medium stream including water. The cold medium compartment spans from the first end to the second end. The cold medium compartment includes a cold medium inlet and a cold medium outlet. The cold medium inlet is disposed at the second end. The cold medium inlet is configured to receive a cold medium stream. The air gap compartment spans from the first end to the second end. The air gap compartment is intermediate of the hot medium compartment and the cold medium compartment. The air gap compartment includes a permeate outlet. The membrane spans from the first end to the second end. The membrane is disposed between the hot medium compartment and the air gap compartment. The membrane defines pores that are sized to allow water vapor originating from the hot medium stream to pass from the hot medium compartment through the membrane to the air gap compartment. The thermally conductive plate spans from the first end to the second end. The thermally conductive plate is disposed between the air gap compartment and the cold medium compartment. The thermally conductive plate and the cold medium stream within the cold medium compartment are cooperatively configured to condense the water vapor from the hot medium compartment that passed through the membrane. The permeate outlet is configured to discharge the condensed water vapor from the air gap compartment. The impeller is disposed within the air gap compartment. The impeller is connected to a rotatable shaft. The impeller is configured to mix fluid within the air gap compartment in response to the rotatable shaft being rotated. The motor is coupled to the rotatable shaft. The motor is configured to rotate the rotatable shaft in response to receiving power.

This, and other aspects, can include one or more of the following features.

In some implementations, the impeller has a blade angle in a range of from 1° to 55°.

In some implementations, the system includes a first heat exchanger in fluid communication with the hot medium compartment and the membrane. In some implementations, the first heat exchanger is configured to heat the hot medium stream before the hot medium stream is received by the hot medium inlet. In some implementations, the system includes a second heat exchanger in fluid communication with the cold medium compartment and the thermally conductive plate. In some implementations, the second heat exchanger is configured to cool the cold medium stream before the cold medium stream is received by the cold medium inlet.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Membrane distillation (MD) is a combined thermal and membrane-based separation process which allows vapor permeation across a membrane and prevents liquid penetration. The MD separation process is commonly applied in water desalination by separating water vapor from a brine stream using a micro-porous membrane. The feed stream received by the feed side of the MD is usually warm to encourage evaporation, while the temperature of the coolant stream received by the coolant side of the MD is usually kept lower than that of the feed stream temperature to encourage condensation. The driving force for water vapor permeation across the membrane is the vapor pressure difference. The vapor pressure difference is induced by the temperature gradient across the membrane. Membrane distillation can be performed at a low feed temperature (usually less than 100° C.) and can be operated by renewable energy and low grade energy sources, such as solar energy, wind energy, geothermal energy, and waste heat.

The MD module generally exist in four main configurations that include sweeping gas membrane distillation (SGMD), vacuum membrane distillation (VIVID), direct contact membrane distillation (DCMD) and air gap membrane distillation (AGMD). These MD configurations is operated by the same principle (vapor generation, vapor permeation across membrane and vapor condensation). The differences among these configurations lie in the design of their condensation chambers, while the feed side of the modules typically remain the same for all configurations. While the direct contact membrane distillation system yields high permeate flux, it is characterized by high conductive heat loss and high temperature polarization effect. Permeate contamination is possible in DCMD. AGMD is characterized by low conductive heat loss and low temperature polarization effect. However, AGMD yields low permeate flux due to resistance to mass transfer by air in the distillate chamber.

Despite the introduction of innovative designs to MD and advancements in the membrane development, membrane distillation technology is still not commonly used at commercial scales. An objective of the current disclosure is to propose an AGMD module with an impeller installed within the air gap of the module. The subject matter described in this disclosure can be implemented, for example, in desalination, waste treatment, food, and medical applications. The subject matter described in this disclosure can be implemented in particular implementations, so as to realize one or more of the following advantages. The rotating impeller can produce suction (decreased pressure) on the permeate side of the membrane, thereby promoting vapor permeation through the membrane and enhancing permeate flux and energy efficiency. Further, the rotating impeller can induce turbulent dissipation in the distillation zone, thereby promoting mass and heat transfer within the distillate zone.

Figure 1A:
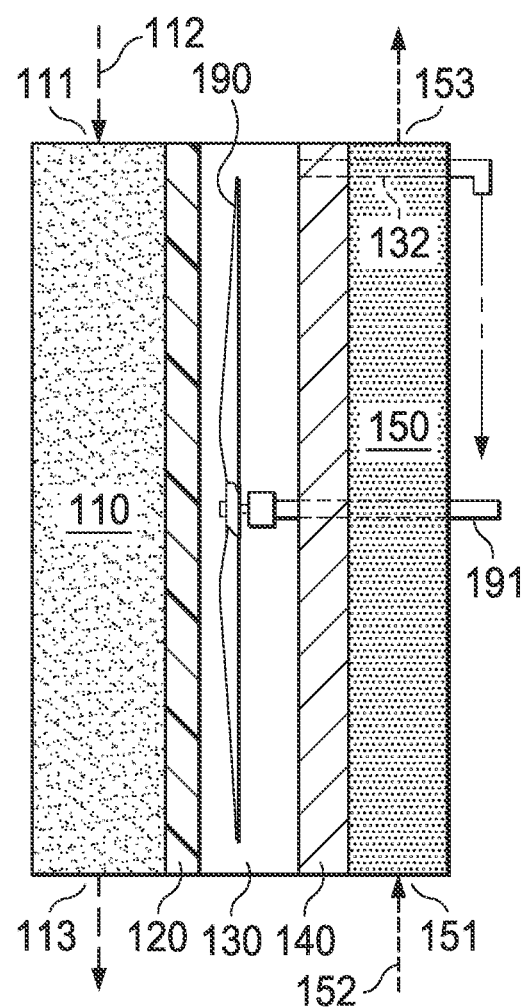
FIG. 1A is a schematic diagram of an example membrane distillation apparatus.

FIG. 1A is a schematic diagram of a membrane distillation apparatus 100. The apparatus 100 can be an MD module having a configuration selected from a reinforced hollow tube configuration, a non-reinforced hollow tube configuration, a spiral wound configuration, a flat sheet configuration or non-flat configuration. The apparatus 100 includes a housing 101 and an impeller 190. The housing 101 includes a hot medium compartment 110, a air gap compartment 130, and a cold medium compartment 150. The housing 101 includes a membrane 120 disposed between the hot medium compartment 110 and the air gap compartment 130. The housing 101 includes a thermally conductive plate 140 disposed between the air gap compartment 130 and the cold medium compartment 150. The impeller 190 is disposed within the air gap compartment 130. In some implementations, the housing 101 comprises a first end 101a and a second end 101b that is opposite the first end 101a. In some implementations, each of the hot medium compartment 110, the membrane 120, the air gap compartment 130, the thermally conductive plate 140, and the cold medium compartment 150 spans from the first end 101a to the second end 101b.

The hot medium compartment 110 includes a hot medium inlet 111 and a hot medium outlet 113. The hot medium inlet 111 is configured to receive a hot medium stream 112 that includes water. The hot medium stream 112 can be considered a feed stream. The hot medium stream 112 can be, for example, seawater, industrial wastewater, brackish water, produced water, fruit juice, blood, milk, dye, harmful waste flow, brine solution, non-condensable gas, non-potable water, or any liquid including dissolved salt, for example, a mixture of salts, a salt and organic contaminant mixture, a salt and inorganic contaminant mixture, or a combination of these. The hot medium outlet 113 is configured to discharge the hot medium stream 112 from the housing 101. In some implementations, the hot medium inlet 111 is disposed at the first end 101a of the housing 101. In some implementations, the hot medium outlet 113 is disposed at the second end 101b of the housing 101.

The membrane 120 defines multiple pores 121 that are sized to allow water vapor originating from the hot medium stream 112 to pass from the hot medium compartment 110 through the membrane 120 to the air gap compartment 130. The membrane 120 is configured to prevent liquid from passing through the membrane 120. The membrane 120 can be, for example, a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane. In some implementations, the membrane 120 includes a support layer and an active layer. The membrane 120 can be made, for example, from a porous material. In some implementations, a contact angle of a droplet of the hot medium stream 112 on the membrane 120 is greater than 90 degrees (°).

The air gap compartment 130 includes a permeate outlet 131. The air gap compartment 130 is substantially filled with air. In some implementations, the air filling the air gap compartment 130 is humidified air. In some implementations, the width of the air gap compartment 130 is in a range of from about 0.05 millimeters (mm) to 200 mm. In some implementations, the air gap compartment 130 is a fixed gap compartment. For example, the width of the air gap compartment 130 between the membrane 120 and the thermally conductive plate 140 is uniform from the first end 101a to the second end 101b. In some implementations, the air gap compartment 130 is a variable gap compartment. For example, the width of the air gap compartment 130 between the membrane 120 and the thermally conductive plate 140 is non-uniform from the first end 101a to the second end 101b. For example, the thermally conductive plate 140 can be disposed at an angle deviating from the vertical, such that the width of the air gap compartment 130 between the membrane 120 and the thermally conductive plate 140 gradually increases from the first end 101a to the second end 101b.

The impeller 190 is connected to a rotatable shaft 191 that is configured to couple to and be rotated by a motor (shown in FIG. 1B and described in more detail later). In some implementations, rotation of the rotatable shaft 191 (and in turn, the impeller 190) is provided by a motor-less magnetic induction means, Geneva drive, Maltese cross mechanism, or anchor escapement. The impeller 190 is configured to mix fluid within the air gap compartment 130 in response to the rotatable shaft 191 being rotated by the motor. In some implementations, the impeller 190 includes a single blade. In some implementations, the impeller 190 includes multiple blades. In some implementations, the impeller 190 has a blade angle in a range of from 1° to 55°. The blade(s) of the impeller 190 can be of a regular shape (such as circular or triangular) or an irregular shape. In some implementations, the impeller 190 is maintained at a distance of at least 1 mm or at least 2 mm away from the membrane 120. In some implementations, the impeller 190 is maintained at a distance of at least 1 mm or at least 2 mm away from the thermally conductive plate 140. The impeller 190 can be made of a material that is non-corrosive (that is, resistant to corrosion) and chemically inert in relation to the hot medium stream 112, the cold medium stream 152, and the permeate stream 132. The impeller 190 can be made, for example, from metallic material, polymeric material, composite material, carbon fibers, carbon nanotubes, or sapphire.

In some implementations, the rotatable shaft 191 penetrates the housing 101 through a rubber seal bearing. The rubber seal bearing prevents and/or mitigates fluid leakage from the housing, for example, while the rotatable shaft 191 rotates. In some implementations, the rubber seal bearing maintains a position of the rotatable shaft 191 relative to other components of the apparatus 100, for example, while the rotatable shaft 191 rotates. For example, the rubber seal bearing can maintain the rotatable shaft 191 to be perpendicular to the membrane 120 and the thermally conductive place 140. For example, the rubber seal bearing can maintain an axial position of the rotatable shaft 191 such that the impeller 190 is maintained at a distance of at least 1 mm or at least 2 mm away from the membrane 120 and also at least 1 mm or at least 2 mm away from the thermally conductive plate 140. In some implementations, the rubber seal bearing includes an inner rubber ring and an outer rubber ring separated by multiple roller balls. In some implementations, the roller balls are carried within a cage that is covered by a sealing disk. In some implementations, the rubber seal bearing is fit into the thermally conductive plate 140, which can prevent leakage of fluid through the thermally conductive plate 140.

The cold medium compartment 150 includes a cold medium inlet 151 and a cold medium outlet 153. The cold medium inlet 151 is configured to receive a cold medium stream 152. The cold medium stream 152 can be considered a coolant. The cold medium stream 152 can be, for example, the hot medium stream 112 after the hot medium stream 112 exits the hot medium outlet 113 and has been cooled for use as a coolant. In some implementations, the cold medium stream 152 includes water, air, oil, or a combination of these. In some implementations, the cold medium stream 152 includes a fluid other than water, air, or oil. The cold medium outlet 153 is configured to discharge the cold medium stream 152 from the housing 101. In some implementations, the cold medium inlet 151 is disposed at the second end 101b of the housing 101. In some implementations, the cold medium outlet 153 is disposed at the first end 101a of the housing 101. Having the hot medium inlet 111 and the cold medium inlet 151 at opposing ends of the housing 101 and the hot medium outlet 113 and the cold medium outlet 153 at opposing ends of the housing 101 allows for the hot medium stream 112 and the cold medium stream 152 to flow in a counter-current manner through the housing 101, which can improve heat transfer within the housing 101. In some implementations, the hot medium stream 112 and the cold medium stream 152 flow in a concurrent flow manner through the housing 101. In some implementations, the hot medium stream 112 and the cold medium stream 152 flow in a cross-flow manner through the housing 101.

The thermally conductive plate 140 and the cold medium stream 152 within the cold medium compartment 150 are cooperatively configured to condense the water vapor (from the hot medium compartment 110 that passed through the membrane 120) in the air gap compartment 130 to form a permeate stream 132. In some implementations, the thermally conductive plate 140 is in the form of a thin, metallic plate or a thin, polymeric plate. In some implementations, the thermally conductive plate 140 is in the form of thin, metallic tubes or thin, polymeric tubes. The thermally conductive plate 140 can be made, for example, from metallic material, composite material, carbon fibers, carbon nanotubes, or sapphire. The permeate stream 132 formed in the air gap compartment 130 is discharged from the apparatus 100 via the permeate outlet 131. The permeate stream 132 has a water purity level that is greater than a water purity level of the hot medium stream 112.

In some implementations, the apparatus 100 includes a first heat exchanger 160a in fluid communication with the hot medium compartment 110 and the membrane 120. In such implementations, the first heat exchanger 160a can be configured to heat the hot medium stream 112 before the hot medium stream 112 is received by the hot medium inlet 111. The first heat exchanger 160a can utilize, for example, renewable energy, low-enthalpy geothermal energy, industrial waste heat, low or high-grade energy sources, an electric source, low-grade steam from nuclear power plants, heat from any thermal plants such as diesel engines, power plants, desalination plants, or a combination of these to heat the hot medium stream 112. In some implementations, the hot medium stream 112 is pressurized before being received by the hot medium inlet 111. In some cases, pressurizing the hot medium stream 112 can also result in increasing the temperature of the hot medium stream 112.

In some implementations, the apparatus 100 includes a second heat exchanger 160b in fluid communication with the cold medium compartment 150 and the thermally conductive plate 140. In such implementations, the second heat exchanger 160b can be configured to cool the cold medium stream 152 before the cold medium stream 152 is received by the cold medium inlet 151.

The hot medium compartment 110, the air gap compartment 130, and the cold medium compartment 150 of the apparatus 100 may be of any shape, such as rectangular, triangular, square, circular, cylindrical, hexagonal, or spherical. The housing 101 can be made, for example, from metallic material, polymeric material, composite material, carbon fiber, carbon nanotube, or sapphire. In some implementations, the housing 101 is made of steel, brass, copper, high density polyethylene (HDPE), acrylic, or polyvinyl chloride (PVC).

In some implementations, the housing 101 includes a frame, support, gasket, or a combination of these, which can provide structural support for any of the compartments (110, 130, 150), the membrane 120, and/or the thermally conductive plate 140. The supporting structure can be made of a material that is non-corrosive and chemically inert in relation to the hot medium stream 112 and the cold medium stream 152. The supporting structure can be made, for example, from metallic material, polymeric material, composite material, carbon fibers, carbon nanotubes, or sapphire.

Figure 1B:
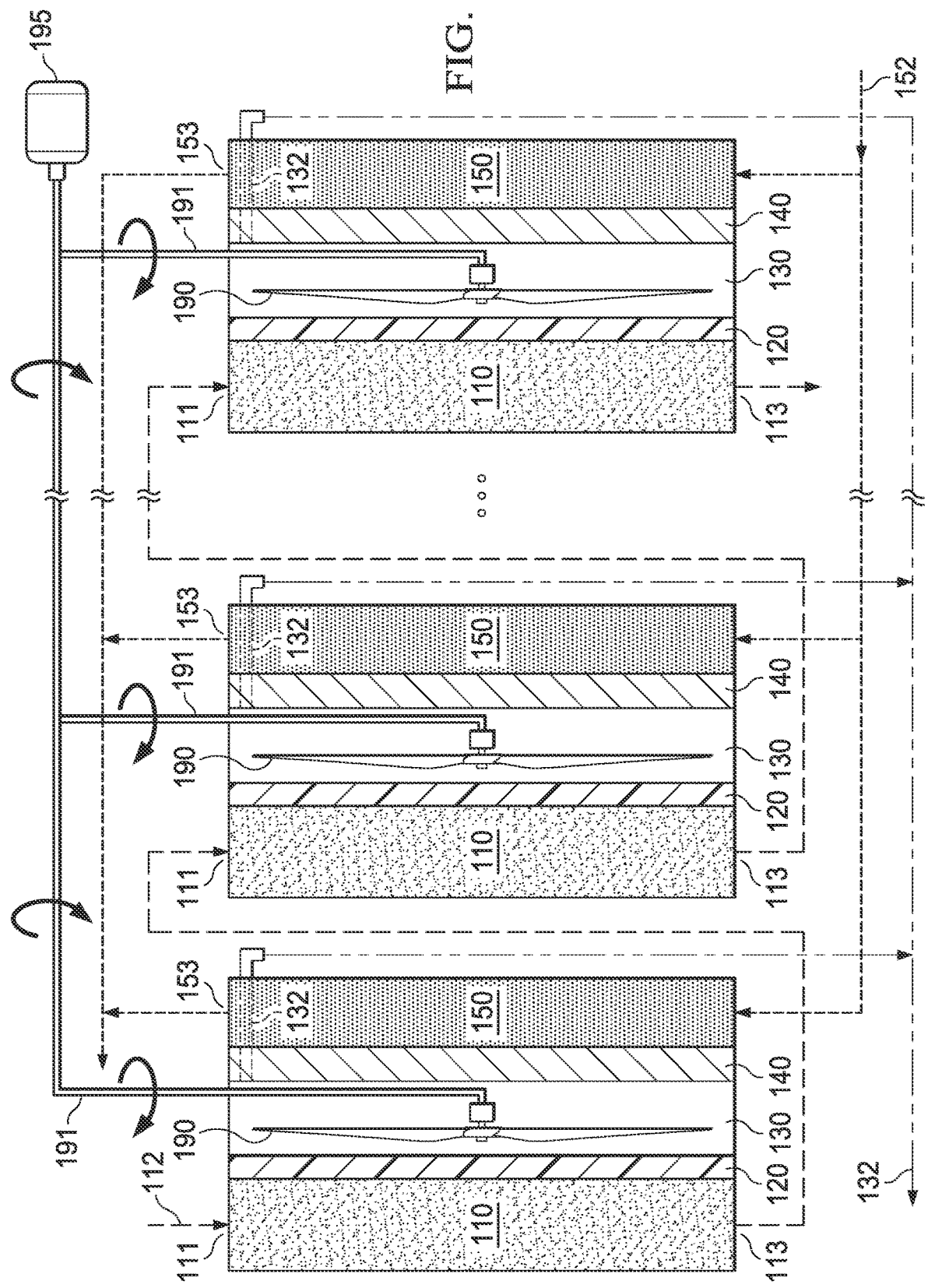
FIG. 1B is a schematic diagram of an example membrane distillation system.

FIG. 1B is a schematic diagram of a system 1000a including multiple implementations of the apparatus 100 in series. Each individual implementation of the apparatus 100 is labeled with a letter (100a, 100b, 100c) in this example. Although shown in FIG. 1B as including three implementations of the apparatus 100 in series, the system 1000a can include fewer implementations (for example, two implementations) or additional implementations (for example, four or five implementations) of the apparatus 100 in series. The system 1000a includes a motor 195 that is coupled to the rotatable shafts 191 of the apparatuses 100. The motor 195 is configured to rotate the rotatable shafts 191 (and in turn, the impellers 190) in response to receiving power. The motor 195 can receive power, for example, from electricity, a photovoltaic cell, a battery, mechanical means, or chemical means. Although shown in FIG. 1B as including a single motor 195 connected to all of the rotatable shafts 191, the system 1000a can include additional implementations of the motor 195. For example, the system 1000a can include a separate motor 195 for each of the rotatable shafts 191. For example, if the system 1000a includes three rotatable shafts 191, then the system 1000a can include three motors 195.

In the series configuration, the hot medium outlet 113 of apparatus 100a discharges the hot medium stream 112 to the hot medium inlet 111 of apparatus 100b, and the hot medium outlet 113 of apparatus 100b discharges the hot medium stream 112 to the hot medium inlet 111 of apparatus 100c. In some implementations (as shown in FIG. 1B), the cold medium stream 152 is split and distributed to each of the cold medium inlets 151 of the various apparatuses 100a, 100b, and 100c in a parallel configuration. In some implementations similar to the series flow configuration of the hot medium stream 112, the cold medium outlet 153 of apparatus 100c discharges the cold medium stream 152 to the cold medium inlet 151 of apparatus 100b, and the cold medium outlet 153 of apparatus 100b discharges the cold medium stream 152 to the cold medium inlet 151 of apparatus 100a. Regardless of the configuration, the difference between the operating temperature of the hot medium stream 112 and the operating temperature of the cold medium stream 152 entering each apparatus (100a, 100b, 100c) is at least 10 degrees Celsius (° C.). In some implementations, the difference between the operating temperature of the hot medium stream 112 and the operating temperature of the cold medium stream 152 entering each apparatus (100a, 100b, 100c) is in a range of from 10° C. and 20° C.

In the series configuration, because some mass from the hot medium stream 112 is transferred as permeate in each of the apparatuses 100a, 100b, and 100c, the hot medium stream 112 exiting each apparatus has a decreased mass flow in comparison to the hot medium stream 112 that entered that respective apparatus. Further, the hot medium stream 112 exiting each apparatus has a decreased water purity in comparison to the hot medium stream 112 that entered that respective apparatus. For example, the hot medium stream 112 exiting apparatus 100a has a decreased mass flow and a decreased water purity in comparison to the hot medium stream 112 entering apparatus 100a. For example, the hot medium stream 112 exiting apparatus 100b has a decreased mass flow and a decreased water purity in comparison to the hot medium stream 112 entering apparatus 100b. For example, the hot medium stream 112 exiting apparatus 100c has a decreased mass flow and a decreased water purity in comparison to the hot medium stream 112 entering apparatus 100c.

The permeate streams 132 exiting each of the apparatuses 100a, 100b, and 100c can be combined. The resulting combined stream can be considered the purified water stream. In some implementations, the purified water stream can undergo additional processing to further purify the water stream.

Figure 1C:
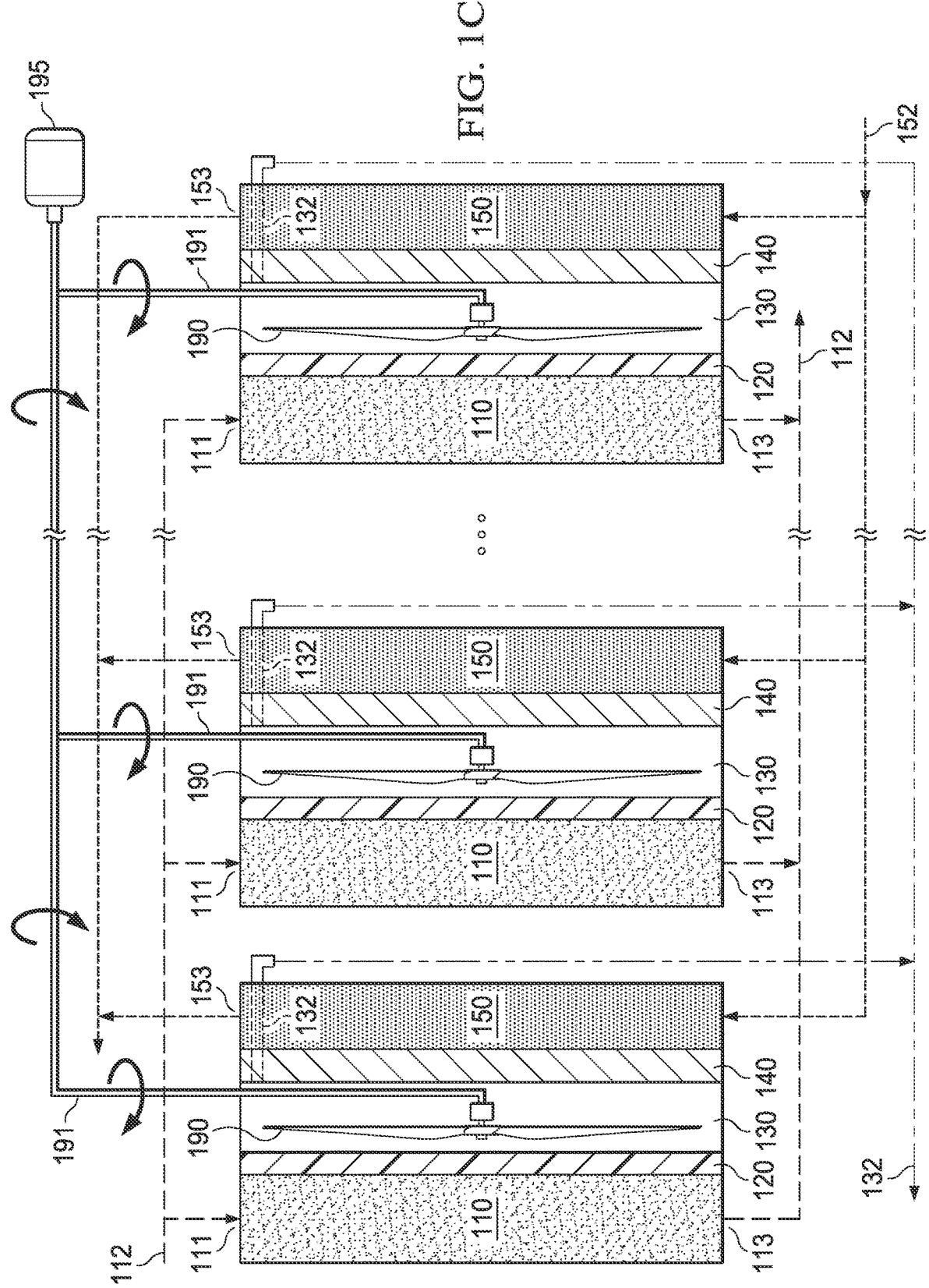
FIG. 1C is a schematic diagram of an example membrane distillation system.

FIG. 1C is a schematic diagram of a system 1000b that is substantially similar to the system 1000a, but includes multiple implementations of the apparatus 100 in parallel (as opposed to in series). Although shown in FIG. 1C as including three implementations of the apparatus 100 in parallel, the system 1000b can include fewer implementations (for example, two implementations) or additional implementations (for example, four or five implementations) of the apparatus 100 in parallel. The system 1000b includes a motor 195 that is coupled to the rotatable shafts 191 of the apparatuses 100. The motor 195 is configured to rotate the rotatable shafts 191 (and in turn, the impellers 190) in response to receiving power. The motor 195 can receive power, for example, from electricity, a photovoltaic cell, a battery, mechanical means, or chemical means. Although shown in FIG. 1C as including a single motor 195 connected to all of the rotatable shafts 191, the system 1000b can include additional implementations of the motor 195. For example, the system 1000b can include a separate motor 195 for each of the rotatable shafts 191. For example, if the system 1000b includes three rotatable shafts 191, then the system 1000b can include three motors 195.

In the parallel configuration, the hot medium stream 112 is split and distributed to each of the hot medium inlets 111 of the various apparatuses 100a, 100b, and 100c. In some implementations (as shown in FIG. 1C), the cold medium stream 152 is split and distributed to each of the cold medium inlets 151 of the various apparatuses 100a, 100b, and 100c in a parallel configuration.

The permeate streams 132 exiting each of the apparatuses 100a, 100b, and 100c can be combined. The resulting combined stream can be considered the purified water stream. In some implementations, the purified water stream can undergo additional processing to further purify the water stream.

Figure 2:
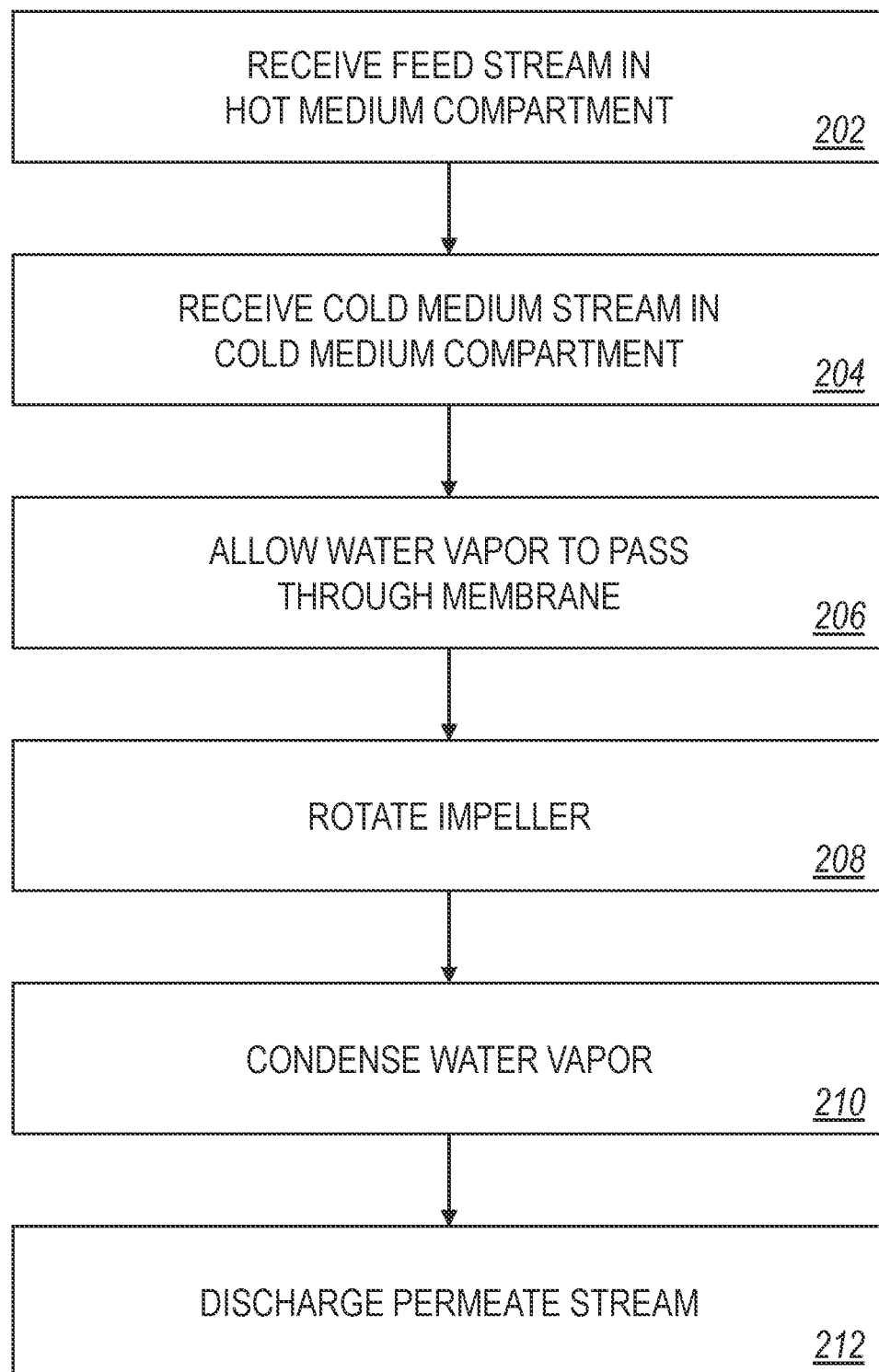
FIG. 2 is a flow chart of an example method for membrane distillation.

FIG. 2 is a flow chart of a method 200 for membrane distillation. The apparatus 100 can be used to implement the method 200. At step 202, a feed stream including water (such as the hot medium stream 112) is received in a hot medium compartment (such as the hot medium compartment 110) of a membrane distillation apparatus (such as the apparatus 100). In some implementations, the hot medium stream 112 is heated (for example, by a first heat exchanger 160a) before the hot medium stream 112 is received in the hot medium compartment 110 at step 202.

At step 204, a cold medium stream (such as the cold medium stream 152) is received in a cold medium compartment (such as the cold medium compartment 150) of the apparatus 100. As described previously, the apparatus 100 includes an air gap compartment 130 that is intermediate of the hot medium compartment 110 and the cold medium compartment 150, and the air gap compartment 130 is substantially filled with air. In some implementations, the cold medium stream 152 is cooled (for example, by a second heat exchanger 160b) before the cold medium stream 152 is received in the cold medium compartment 150 at step 204.

At step 206, water vapor originating from the hot medium stream 112 is allowed by a membrane (such as the membrane 120) to pass from the hot medium compartment 110 through the membrane 120 to the air gap compartment 130 while liquid is prevented from passing through the membrane 120. As described previously, the membrane 120 is disposed within the apparatus 100 between the hot medium compartment 110 and the air gap compartment 130. In some implementations, the first heat exchanger 160a heats the membrane 120.

At step 208, an impeller (such as the impeller 190) disposed within the air gap compartment 130 is rotated, thereby resulting in mixing fluid within the air gap compartment 130. Rotating the impeller 190 at step 208 can also result in decreasing pressure on a side of the membrane 120 facing the air gap compartment 130. Rotating the impeller 190 at step 208 can also result in promoting heat and mass transfer within the air gap compartment 130.

At step 210, the water vapor from the hot medium compartment 110 that passed through the membrane 120 is condensed by a thermally conductive plate (such as the thermally conductive plate 140) to form a permeate stream (such as the permeate stream 132) having a water purity level that is greater than that of the hot medium stream 112. As described previously, the thermally conductive plate 140 is disposed within the apparatus 100 between the cold medium compartment 150 and the air gap compartment 130. In some implementations, condensing the water vapor at step 210 includes contacting the water vapor on a first side of the thermally conductive plate 140 facing the air gap compartment 130 and contacting the cold medium stream 152 on a second side of the thermally conductive plate 140 facing the cold medium compartment 150. In some implementations, the second heat exchanger 160b cools the thermally conductive plate 140.

At step 212, the permeate stream 132 is discharged from the apparatus 100 by a permeate outlet (such as the permeate outlet 131) of the air gap compartment 130.

Although shown in FIG. 2 as a progression of steps, the steps of method 200 are not necessarily performed in sequence and can instead be performed in parallel. That is, all of the steps of method 200 can occur simultaneously. In some cases, portions of each of the steps of method 200 can overlap temporally.

EXAMPLE

An air gap membrane distillation module included a flat sheet polytetrafluoroethylene membrane with an effective area of 0.00309 square meters and a mean pore size of 0.45 micrometers. The air gap compartment width was created with acrylic plastic having an effective gap width of 11 millimeters between the thermally conductive plate and the membrane. A direct current motor was used to drive rotation of the impeller installed within the air gap compartment. The motor power consumption for each test was 0.817 watts. The feed stream (hot medium stream) salinity was maintained at about 900 milligrams per liter throughout the experiment. The flow rate of the feed stream was maintained at 1.4 liters per minute. The flow rate of the cold medium stream was maintained at 1.95 liters per minute. The operating temperature of the cold medium stream entering the module was 15° C. The operating temperature of the feed stream entering the module was varied for the various tests (60° C., 70° C., and 80° C.). The salt rejection factor (that is, the percentage of salt removal from the feed water stream) was greater than 99% throughout the experiment.

Figure 3:
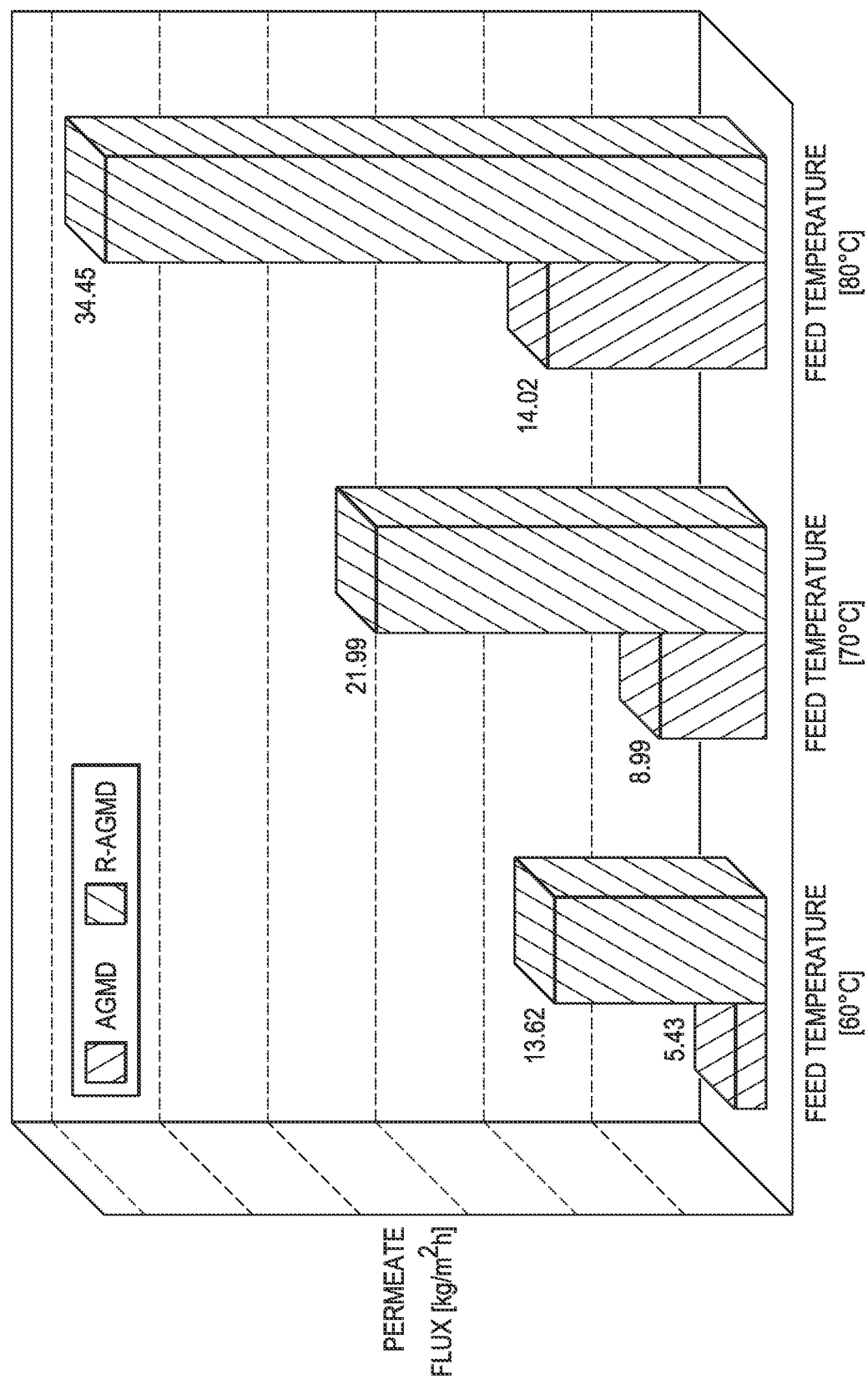
FIG. 3 is a comparative chart of permeate flux at various operating temperatures.

FIG. 3 shows the permeate flux production for an AGMD system without the rotating impeller and an R-AGMD system that included the rotating impeller. The R-AGMD system including the rotating impeller yielded more permeate flux for each test in comparison to the AGMD system without the rotating impeller. The results presented in FIG. 3 show that the R-AGMD system including the rotating impeller attained, on average, about 147% increase in permeate flux in comparison to the AGMD system without the rotating impeller under the same operating conditions. A maximum permeate flux of greater than 34 kilograms per square meter-hour was attained by the R-AGMD system including the rotating impeller for the test with the feed stream at an operating temperature of 80° C.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A membrane distillation apparatus comprising:
a housing comprising:
    a hot medium compartment comprising a hot medium inlet and a hot medium outlet, the hot medium inlet configured to receive a hot medium stream comprising water;
    a cold medium compartment comprising a cold medium inlet and a cold medium outlet, the cold medium inlet configured to receive a cold medium stream;

an air gap compartment comprising a permeate outlet, the air gap compartment intermediate of the hot medium compartment and the cold medium compartment, the air gap compartment substantially filled with air;

a membrane disposed between the hot medium compartment and the air gap compartment, the membrane defining a plurality of pores sized to allow water vapor originating from the hot medium stream to pass from the hot medium compartment through the membrane to the air gap compartment; and a thermally conductive plate disposed between the air gap compartment and the cold medium compartment, the thermally conductive plate and the cold medium stream within the cold medium compartment cooperatively configured to condense the water vapor from the hot medium compartment that passed through the membrane, wherein the permeate outlet is configured to discharge the condensed water vapor from the air gap compartment; and an impeller disposed within the air gap compartment and connected to a rotatable shaft configured to couple to and be rotated by a motor, wherein the rotatable shaft positions the impeller in a location of the air gap independent of liquid and the impeller having a rotation axis perpendicular to a surface of the membrane that abuts the air gap.

2. The apparatus of claim 1, wherein:
the housing comprises a first end and a second end opposite the first end;
each of the hot medium compartment, the air gap compartment, the cold medium compartment, the membrane, and the thermally conductive plate span from the first end to the second end;
the hot medium inlet and the cold medium outlet are disposed at the first end of the housing; and
the hot medium outlet and the cold medium inlet are disposed at the second end of the housing.

3. The apparatus of claim 2, wherein the membrane is configured to prevent liquid from passing through the membrane, and the membrane comprises a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane.

4. The apparatus of claim 3, wherein a contact angle of a droplet of the hot medium stream on the membrane is greater than 90 degrees.

5. The apparatus of claim 2, wherein the impeller has a blade angle in a range of from 1 degree (°) to 55°.

6. The apparatus of claim 2, wherein the thermally conductive plate comprises metal, composite material, carbon fibers, carbon nanotubes, or sapphire.

7. The apparatus of claim 2, wherein the hot medium stream comprises seawater, industrial wastewater, brackish water, produced water, fruit juice, blood, milk, dye, non-condensable gas, non-potable water, or a combination thereof.

8. The apparatus of claim 2, wherein the cold medium stream comprises the hot medium stream after the hot medium stream has been cooled, water, air, oil, or a combination thereof.

9. The apparatus of claim 2, comprising a first heat exchanger in fluid communication with the hot medium compartment and the membrane, the first heat exchanger configured to heat the hot medium stream before the hot medium stream is received by the hot medium inlet.

10. The apparatus of claim 9, comprising a second heat exchanger in fluid communication with the cold medium compartment and the thermally conductive plate, the second heat exchanger configured to cool the cold medium stream before the cold medium stream is received by the cold medium inlet.

11. A method comprising:
receiving a feed stream comprising water in a hot medium compartment of a membrane distillation apparatus;
receiving a cold medium stream in a cold medium compartment of the membrane distillation apparatus, wherein the membrane distillation apparatus comprises an air gap compartment intermediate of the hot medium compartment and the cold medium compartment, the air gap compartment substantially filled with air;
allowing, by a membrane disposed within the membrane distillation apparatus between the hot medium compartment and the air gap compartment, water vapor originating from the feed stream to pass from the hot medium compartment through the membrane to the air gap compartment while preventing liquid from passing through the membrane;
rotating an impeller disposed within the air gap compartment, thereby decreasing pressure on a side of the membrane facing the air gap compartment and promoting heat and mass transfer within the air gap compartment, wherein a rotatable shaft positions the impeller in a location of the air gap independent of liquid and the impeller having a rotation axis perpendicular to a surface of the membrane that abuts the air gap;
condensing, by a thermally conductive plate disposed within the membrane distillation apparatus between the cold medium compartment and the air gap compartment, the water vapor from the hot medium compartment that passed through the membrane to form a permeate stream having a water purity level greater than the feed stream; and
discharging, by a permeate outlet of the air gap compartment, the permeate stream from the membrane distillation apparatus.

12. The method of claim 11, wherein condensing the water vapor from the hot medium compartment that passed through the membrane comprises contacting the water vapor on a first side of the thermally conductive plate facing the air gap compartment and contacting the cold medium stream on a second side of the thermally conductive plate facing the cold medium compartment.

13. The method of claim 12, comprising heating, by a first heat exchanger, the feed stream before the feed stream is received in the hot medium compartment.

14. The method of claim 13, comprising heating, by the first heat exchanger, the membrane.

15. The method of claim 12, comprising cooling, by a second heat exchanger, the cold medium stream before the cold medium stream is received in the cold medium compartment.

16. The method of claim 15, comprising cooling, by the second heat exchanger, the thermally conductive plate.

17. A membrane distillation system comprising:
an apparatus comprising:
a housing comprising:
a first end;
a second end opposite the first end;
a hot medium compartment spanning from the first end to the second end, the hot medium compartment comprising a hot medium inlet and a hot medium outlet, the hot medium inlet disposed at the first end and configured to receive a hot medium stream comprising water;

a cold medium compartment spanning from the first end to the second end, the cold medium compartment comprising a cold medium inlet and a cold medium outlet, the cold medium inlet disposed at the second end and configured to receive a cold medium stream;

an air gap compartment spanning from the first end to the second end, the air gap compartment intermediate of the hot medium compartment and the cold medium compartment, the air gap compartment comprising a permeate outlet, the air gap compartment substantially filled with air;

a membrane spanning from the first end to the second end and disposed between the hot medium compartment and the air gap compartment, the membrane defining a plurality of pores sized to allow water vapor originating from the hot medium stream to pass from the hot medium compartment through the membrane to the air gap compartment; and a thermally conductive plate spanning from the first end to the second end and disposed between the air gap compartment and the cold medium compartment, the thermally conductive plate and the cold medium stream within the cold medium compartment cooperatively configured to condense the water vapor from the hot medium compartment that passed through the membrane, wherein the permeate outlet is configured to discharge the condensed water vapor from the air gap compartment; and an impeller disposed within the air gap compartment and connected to a rotatable shaft, wherein the rotatable shaft positions the impeller in a location of the air gap independent of liquid and the impeller having a rotation axis perpendicular to a surface of the membrane that abuts the air gap; and a motor coupled to the rotatable shaft, the motor configured to rotate the rotatable shaft in response to receiving power.

18. The system of claim 17, wherein the impeller has a blade angle in a range of from 1 degree (°) to 55°.

19. The system of claim 18, comprising:

a first heat exchanger in fluid communication with the hot medium compartment and the membrane, the first heat exchanger configured to heat the hot medium stream before the hot medium stream is received by the hot medium inlet; and a second heat exchanger in fluid communication with the cold medium compartment and the thermally conductive plate, the second heat exchanger configured to cool the cold medium stream before the cold medium stream is received by the cold medium inlet.

* * * * *